Dec. 5, 1933.   O. H. BANKER   1,937,503
VARIABLE SPEED TRANSMISSION
Filed Sept. 3, 1931   4 Sheets-Sheet 1

Inventor:
Oscar H. Banker
By Marles & French Attys.

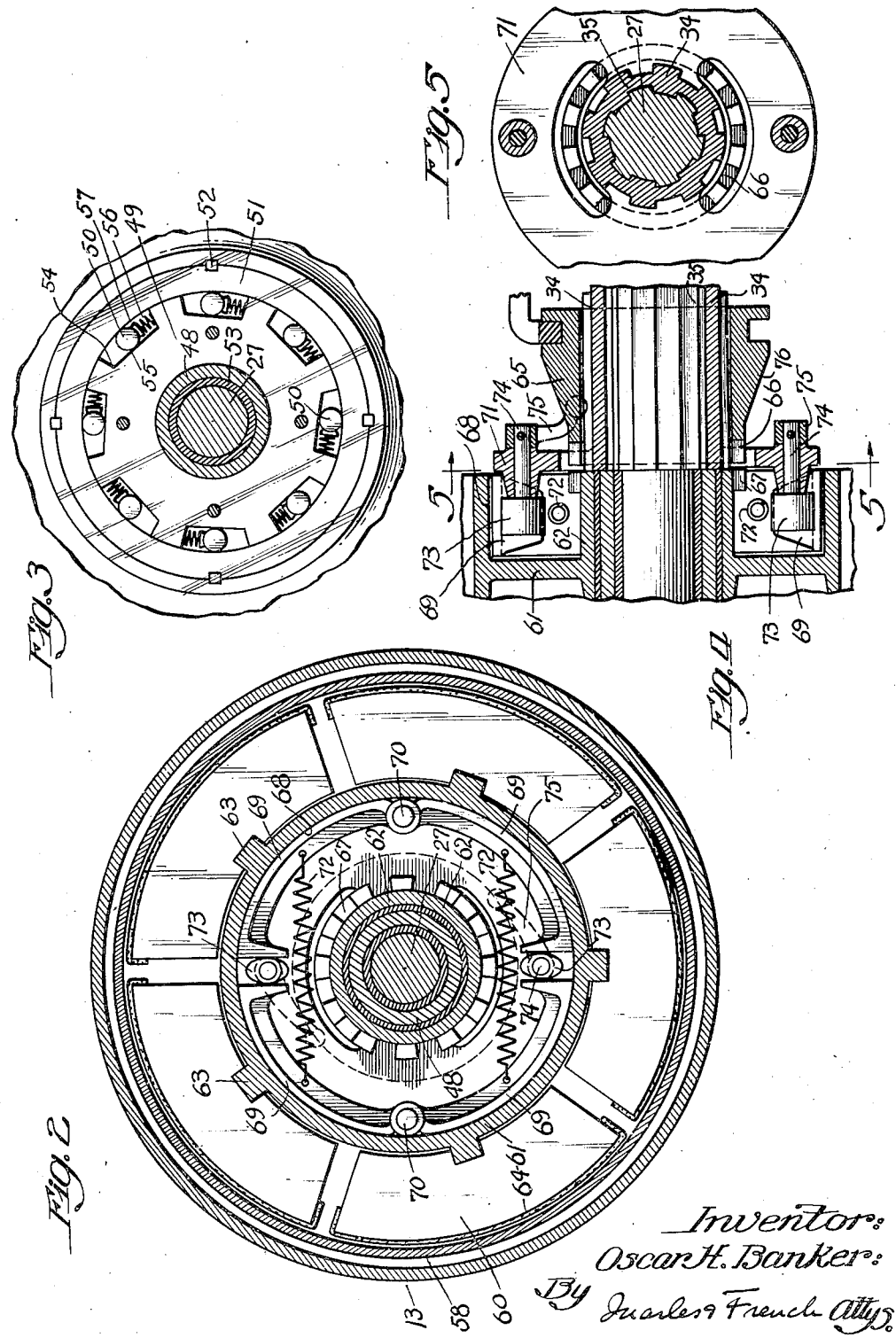

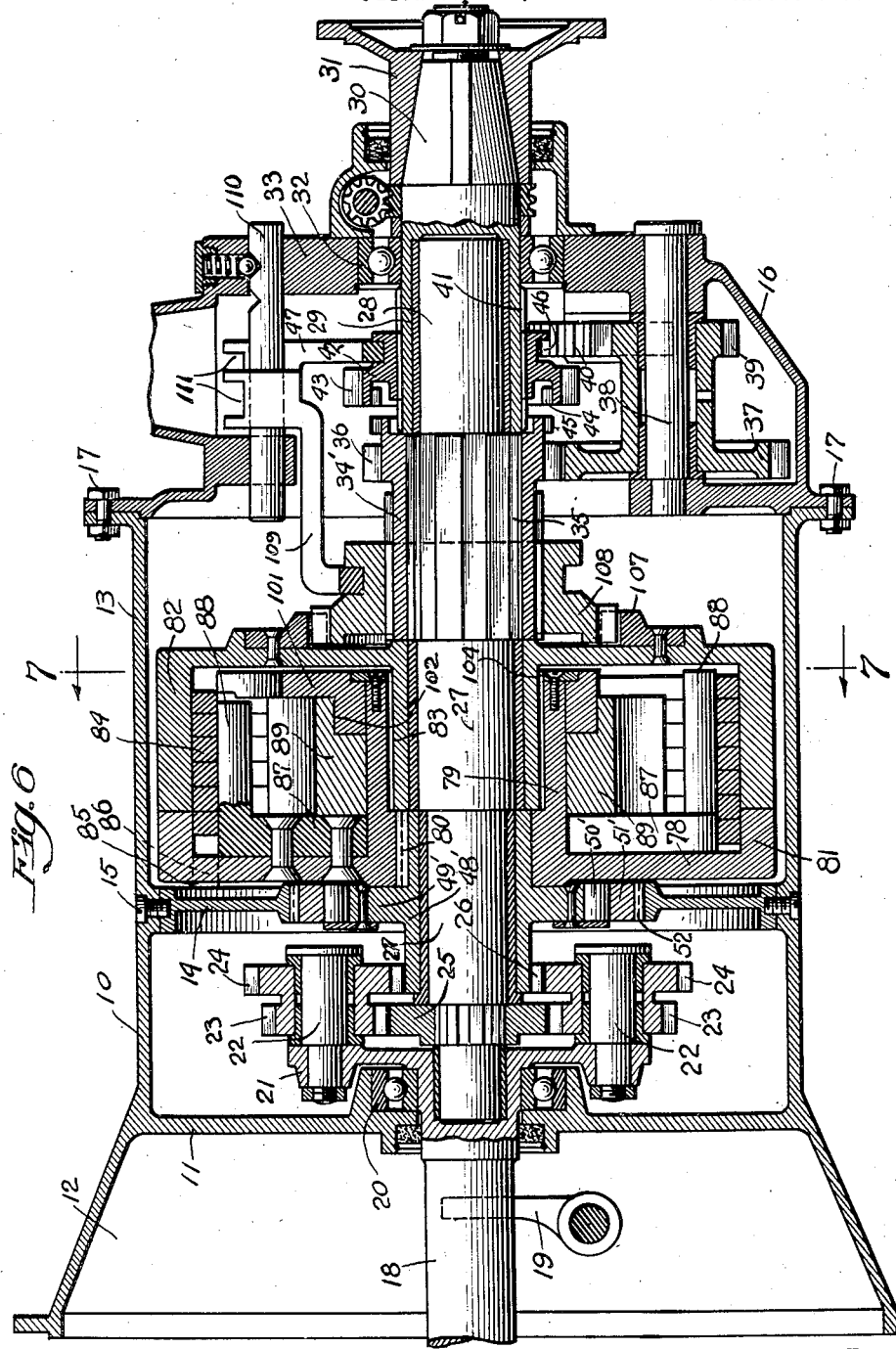

Dec. 5, 1933.   O. H. BANKER   1,937,503
VARIABLE SPEED TRANSMISSION
Filed Sept. 3, 1931   4 Sheets-Sheet 4
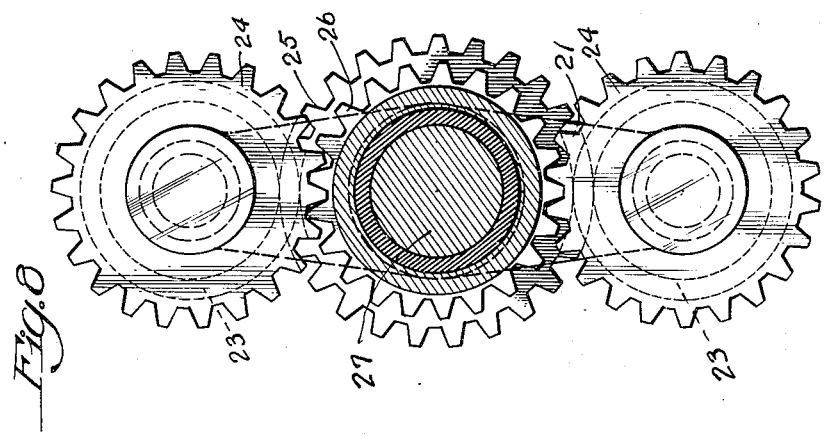
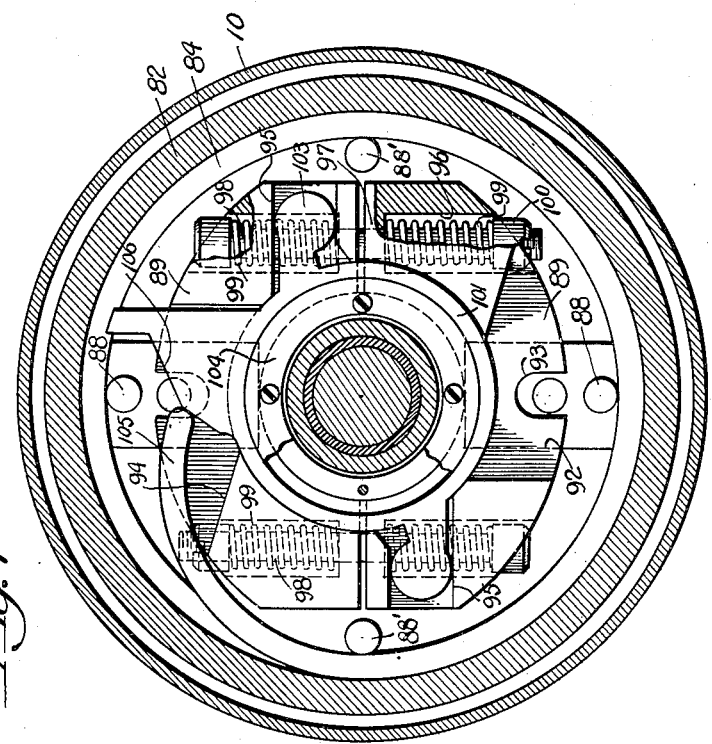
Inventor:
Oscar H. Banker
By
Juarles + French Attys.

Patented Dec. 5, 1933

1,937,503

UNITED STATES PATENT OFFICE 1,937,503

VARIABLE SPEED TRANSMISSION

Oscar H. Banker, Chicago, Ill., assignor to New Products Corporation, Chicago, Ill., a corporation of Delaware Application September 3, 1931. Serial No. 560,960

4 Claims. (Cl. 74—34)

The invention relates to variable speed transmissions and more particularly to such transmissions of the planetary gear type.

One of the objects of the invention is to provide an automatically variable change speed transmission wherein the planetary gear carrier carrying the planet gears, is the driving member and one of the sun gears is the stationary member and means are provided responsive to changes in speed for driving the driven shaft either through said gearing at reduced speed or for rotating said gearing as a unit with the drive and driven shafts in high speed or direct drive with means under the control of the operator for immediately placing the vehicle in low gear while the transmission is operating in high and for thereafter putting the transmission into a condition for attaining high gear or direct drive.

A further object of the invention is to provide a transmission of the type above described wherein the operator may keep the transmission in gear as long as he desires and then put the transmission in high gear by the deceleration of the speed of the drive shaft.

A further object of the invention is to provide various improvements hereinafter described in an automatic multi-speed transmission of the planetary gear type.

The invention further consists in the several features hereinafter described and more particularly defined by claims at the conclusion hereof;

In the drawings, Fig. 1 is a vertical sectional view through a transmission mechanism embodying the invention;

Fig. 2 is a detail sectional view taken on the line 2—2 of Fig. 1;

Fig. 3 is a detail sectional view taken on the line 3—3 of Fig. 1;

Fig. 4 is an enlarged detail sectional view of a portion of the transmission shown in Fig. 1 showing certain of the parts in an intermediate position;

Fig. 5 is a detail sectional view taken on the line 5—5 of Fig. 4;

Fig. 6 is a vertical sectional view similar to Fig. 1 showing certain modifications;

Fig. 7 is a detail sectional view taken on the line 7—7 of Fig. 6;

Fig. 8 is a detail sectional view taken on the line 8—8 of Fig. 1.

Figure 1:
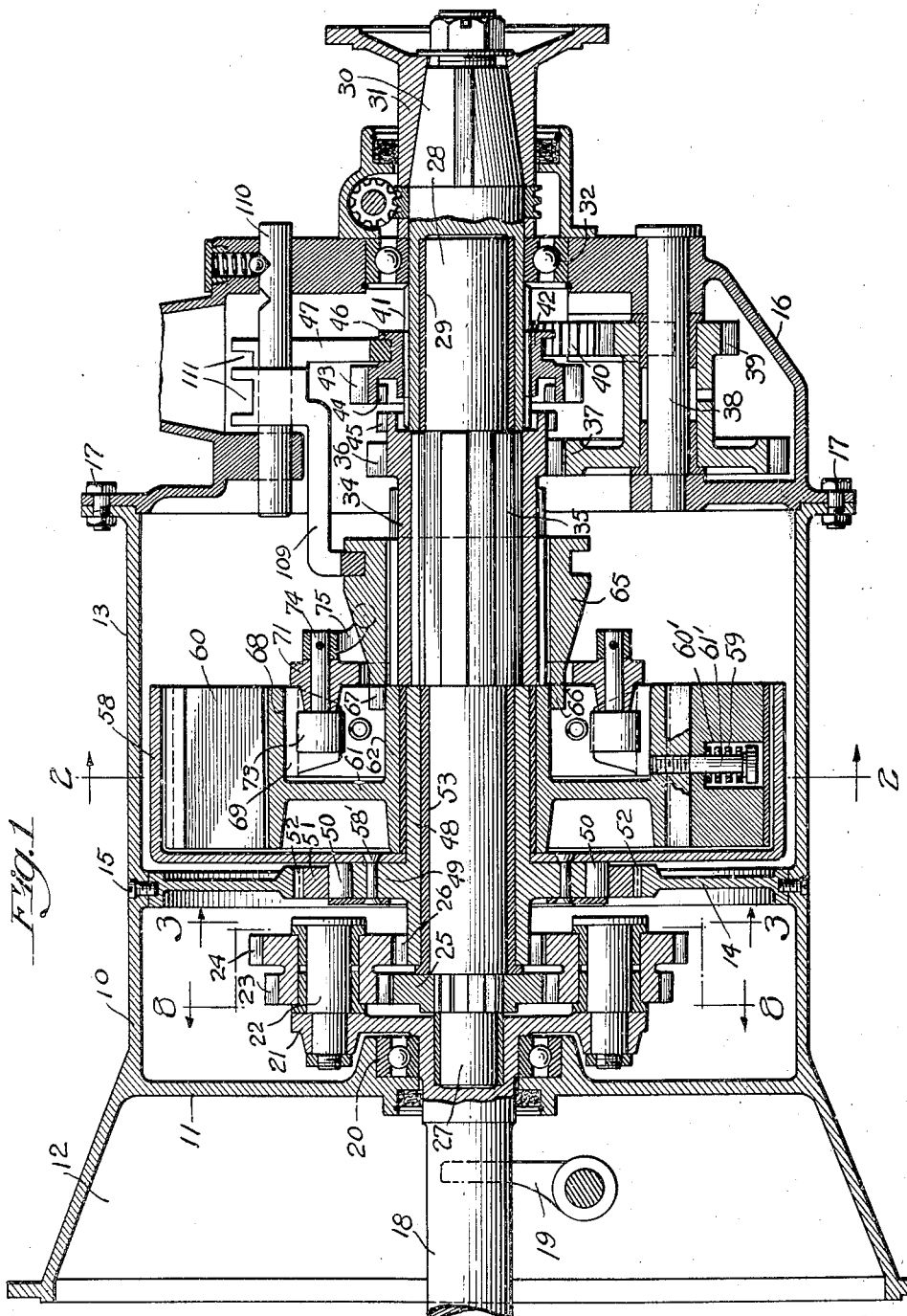

Referring first to Figs. 1 and 6 in each instance the transmission includes a housing 10 divided by a partition 11 into a clutch compartment 12 and a main casing section 13 having a partition 14 removably secured therein by screws 15, the open end of said housing having a casing section 16 removably secured thereto by bolts 17.

The shaft 18 is the drive shaft of the transmission and may be secured to the engine shaft by any suitable clutch mechanism either of the manually controlled or automatic type. Where the manually controlled type is used the manually controlled lever 19 for controlling the same has been indicated. In either type the clutch mechanism is used to connect the drive shaft 18 usually with the fly wheel of the engine or with a connection from the engine shaft. The outer end of the drive shaft 18 is journalled in the ball bearing journal 20 mounted in the partition 11 and has a spider or planet carrier 21 formed integral with or secured to it which carries the shafts 22 upon which the compound planet gears 23 and 24 are journalled. The smaller gears 23 are in mesh with a driven sun gear 25 and the larger gears 24 are in mesh with the sun gear 26 (see Fig. 8), which is stationary when the planetary gearing is operating.

The gear 25 is splined to the driven shaft 27 whose end 28 is mounted in a suitably bushed bore 29 of a driven shaft 30 carrying the propeller shaft coupling 31 which is journalled in a ball bearing journal 32 mounted in the end of the casing 16.

A sleeve member 34 or 34' is keyed to the driven shaft 27 by a splined connection 35 therewith and in each instance has a gear 36 formed thereon meshing with a gear 37, journalled on a jack shaft 38 mounted in the casing section 16. A gear 39 is connected to or formed integral with the hub of the gear 37 and meshes with a reverse idler gear 40.

Upon the splined portion 41 of the shaft 30 a shiftable sleeve member 42 is mounted having a gear 43 formed thereon and also a jaw clutch portion 44 adapted to mesh with a jaw clutch portion 45 formed on the sleeve member 34 and an annular portion 46 in which the forked end of a shifter fork 47 is operatively mounted.

With this arrangement shifting of the member 42 to bring the clutch members 44 and 45 into engagement establishes forward drive conditions wherein the driven shafts 27 and 30 turn as a unit; shifting these clutch members out of engagement to the position shown in Figs. 1 or 6 disconnects the shaft 30 from the driven shaft 27 and establishes the neutral condition of the drive; and shifting the member 42 to bring the gear 43 into mesh with the gear 40 brings the drive through gears 36, 37, 39, 40 and 43 to turn the shaft 30 in the reverse direction to that of the shaft 27 for reverse drive. Also it will be observed that when the gear 26 is held against rotation the drive gears 24 will revolve around the same and drive the driven shaft 27 at a reduced speed through the gears 23 and 25 which is the low speed gear of the unit and that when the gear 26 is permitted to rotate or rotates with the gears 24 the planetary gearing connection will rotate as a unit with both the drive and driven shafts and the transmission will be in high gear or direct drive.

The present invention is more particularly directed to certain novel constructions associated in combination with the parts already described which effects the automatic shifting into high gear and also the control of this high gear ratio at the will of the operator and two forms of the invention are shown.

In planetary gearing of the type herein described as the gears 24 revolve about the gears 26 there is a tendency for this gear to rotate backward and means are provided to automatically prevent backward rotation of said gear 26 and its associated parts but permit the forward rotation of said gear 26 with the gear 24. This means in each instance comprises a one way automatic brake mechanism which is shown in Figs. 1, 6 and 3.

Referring to Figs. 1 and 3, the gear 26 is shown as formed integral with a sleeve shaft 48 which also has a brake actuator 49 formed integral with it that cooperates with the brake elements 50 and the stationary brake drum 51 which is mounted in a centrally disposed opening in the partition 11 and keyed thereto by the keys 52. The shaft 48 is provided with a bearing bushing 53 for the driven shaft 27. The brake elements 50 are in the form of rollers mounted to work in the recesses 54 in the actuator 49, said recesses having inclined or wedge surfaces 55 which cooperate with the drum 51 so that when the actuator 49, is turned or tends to turn backward, said rollers will be moved into braking engagement with the drum 51, said rollers preferably being normally urged by springs 56 acting on blocks 57 engaging the rollers into a position for braking engagement with the drum. When however, the actuator is turned so as to rotate with the driven shaft 27 the brake rollers 50 will be released from the drum 51 and the shaft 48 with the gear 26 will be free to rotate with said shaft 27.

The automatic brake mechanism of the form shown in Fig. 6 is identical with that of Fig. 1 and the parts 48', 49', 50' and 51' correspond to the parts 48, 49, 50 and 51 and are similarly mounted and arranged and operate in a similar manner.

Referring to Figs. 1, 2, 4, and 5, automatic clutch mechanism is provided for causing the release of the automatic brake mechanism and this includes a clutch drum 58 secured to rotate with the shaft 48 as by rivets 58' and cooperating with centrifugally operable clutch elements 60 which form driving connections between said drum and a member 61 adapted to be driven by the driven shaft 27. Normally resistance to outward movement of each element 60 is resisted by a spring 59 mounted in a recess 60' therein as shown in Fig. 1 and interposed between the head of a bolt 61', anchored to the member 61, and the end of the bore of said recess. As shown the member 61 has its hub 62 journaled on the shaft 48 so that it may under certain conditions rotate relative to it and is in the general form of a flanged wheel having radially disposed keys or projections 63 extending at spaced points from its periphery. The clutch elements 60 are in the form of segmental weights or shoes having friction facings 64 adapted when said elements are moved outwardly against the resistance of the springs 59, under the action of centrifugal force, to engage the drum 58 and since the keys 63 form driving connections between the member 61 and these weights, the parts 61, 60, 58, 48 will then rotate as a unit.

Thus if we assume that the member 61 is connected to rotate with the driven shaft 27 when the speed of said driven shaft reaches a certain predetermined value the inertia of the weights or clutch elements 60 and the resistance of the springs 61' will be overcome and the parts above mentioned rotating as a unit will permit the gear 26 to turn with the driven shaft and thus cause the planetary gearing to rotate as a unit with the drive and driven shaft, and the transmission will be in high gear. When however the speed of the driven shaft 27 drops to a value at which the clutch elements 60 recede from clutching engagement with the drum 58 the automatic brake mechanism above described will again function to hold the shaft 48 and gear 26 against rotation and thus cause the planetary gearing to function to drive the shaft 27 in gear or at a lower speed.

Thus the transmission is automatically operable or responsive to changes in speed of the driven shaft to effect the changing of the gear ratios. However it is highly desirable in some instances in driving a vehicle to immediately change from a high to a low gear ratio without waiting for a reduction in speed of the driven shaft and in order to effect this result, means have been provided to provide a positive jaw clutch connection between the driven shaft 27 and the hub of the member 61 so that these parts may be disconnected when the vehicle is in high gear and thus cause the release of the clutch elements 60 and immediately establish the low gear ratio of the transmission. As shown in Figs. 1, 2, 4 and 5 a jaw clutch member 65 is slidably splined to the sleeve member 34 and has a jaw clutch face 66 adapted to engage with jaw clutch teeth or projections 67 formed on the hub 62 of the member 61 so that when these clutch elements are separated the drive from the shaft 27 to the member 61 will be disconnected and the transmission will then be in low gear and can proceed in low gear as long as the operator desires.

When however the operator desires to again go into high gear it is necessary to again establish the clutch engagement and, since under these conditions the clutch member 65 is rotative and the member 61 is then stationary, means have been provided for causing the member 61 to be rotated and to permit a ready engagement of this clutch by the operator. For accomplishing this purpose member 61 is formed to provide a clutch drum surface 68 adapted to be engaged by clutch elements or shoes 69 which are pivotally connected in pairs on pivot pins 70 carried by a spider 71 formed as a part of or connected to the sleeve member 34 and normally held in a release position by the release springs 72 but adapted to be moved in clutched engagement with the surface 68 by cams 73 acting on the free ends of said shoes and mounted in shafts 74 journaled in the spider 71, each shaft 74 carrying a lever arm 75 whose outer end is adapted to be engaged by the tapered or camming surface 76 of the clutch member 65 to cause an initial engagement of said shoes 69 when said member is first moved to effect the jaw clutch engagement, as shown in Fig. 5, and to maintain the continued engagement of said shoes 69 with the member 61 as the clutch face 66 meshes with the clutch teeth 67.

In the operation of this clutch the operator preferably first breaks the torque of the engine by decelerating the speed of the drive shaft, as by a temporary closure of the engine throttle, then shifts cam 65 to cause the clutch elements 69 to pick up and rotate the relatively stationary element 61 to bring the speed to that of the cam 65 and then further movement of the cam 65 will engage the jaw clutches without clash.

Referring to the form shown in Figs. 6 and 7, I have associated an automatic clutch of the coiled spring type for the purpose of establishing the high gear ratio or direct drive. This clutch mechanism is itself novel and is more particularly described and claimed in my copending application Ser. No. 504,018 filed December 22, 1930, for clutch. This clutch includes a disk 78 having a hub portion 79 secured by a key 80 to the sleeve shaft 48' and an annular flange 80. The driven element includes a clutch drum 82 having a hub portion 83. A coiled spring clutch element 84 is operatively connected to the disk 78 by having a hooked end 85 extending through an opening 86 therein and is adapted to have its coils expanded by means hereinafter described to bring them into clutched engagement with the drum 82. The driving element has guide blocks 87 riveted to it and provided with diametrically disposed pin extensions 88. Other pins 88', diametrically disposed and at right angles to the pins 88, are secured to the disk 78 and both sets of pins cooperate to determine the release position of the spring which only has a slight clearance. A pair of governor weights 89 are mounted within the annular enclosure between the disk 78 and drum 82 and are shaped to fit about the hub 79. Each weight has a slot or key way 92 to receive the block 87, a pin clearance slot 93, a clearance recess 94; a pivot recess 95 and enlarged bores 96 at each end alined with bores 97 of reduced diameter.

For tensioning the weights, bolts 98 pass through the sets of alined bores 95 and 96 of each weight and coiled springs 99 surround each bolt within the bores 96 and are interposed between the weights and the head of the bolt and adjusting nut 100 respectively.

An equalizing or synchronizing member 101 for the governor element is provided in the form of a ring having a hub portion rotatable on the hub of the disk 78 and within semi-cylindrical end recesses 102 in the weights and provided with curved pivot projections 103 that have sliding and pivotal connection with the recesses 95 of the weights, said hub portion being restrained against longitudinal movement by a collar 104 secured to the hub 79.

One end of the spring has been referred to as anchored to the disk 78 while the other end 105 is free and projects down into the path of movement of a cam projection 106 on the equalizer and works in the recess 94 of one of the weights.

With the above construction when on a temporary reduction in speed of the drive shaft 18 the driven shaft 27 through the gears 25, 23, 24 and 26 tend to rotate the shaft 48' in a direction to release the automatic brake mechanism previously described, the disk 78 becomes a driver and when the speed thereof becomes sufficient to overcome the tension exerted by the springs 99 on the weights 89, the same move outwardly and as they do so they exert a rotational movement on the member 101 whose cam projection 106 thereupon pushes against the end 105 of the spring and thus moves it into clutching engagement with the drum 82. As soon as the coiled spring clutch member engages with the drum 82 its coils will gradually expand into engagement with the drum and the latter will be driven thereby and since under these conditions the clutch is revolving in the same direction as the driven shaft 27 the planetary gearing will revolve as a unit with these elements and the drive shaft 18 and the transmission will be in high so long as the speed of the vehicle is sufficient to hold the weights 89 in expanded condition. When however a reduction in speed occurs sufficient to cause the springs 99 to retract the weights, they move inwardly and swing the member 101 to a release position to allow the clutch element 84 to retract sufficiently to release itself from engagement with the drum 82 and the transmission is then in low gear.

It will be observed that with this modified construction the weights 89 do not move to establish the high speed relationship until the operator effects a temporary reduction in speed of the drive shaft below that of the driven shaft and it thus differs from the first described construction where the weights 60 are free to act at any time that the speed of the driven shaft reaches a predetermined value. There are certain advantages in the modified form as the operator is under these conditions fully advised of what he is doing and the momentary reduction in speed if the drive shaft is easily effected by a momentary closing of the throttle or other means supplying fuel to the engine. Furthermore the springs 99 are so adjusted that should the operator wish to do so he can shift into high gear at a relatively low speed as for example, eight miles an hour, by decelerating the drive shaft to that speed for since weights 89 are absolutely stationary when the vehicle is proceeding in gear there is no harm done in adjusting these clutch elements for such a low speed action.

As in the first described construction in order to immediately place the transmission in the low gear ratio, while proceeding in high, a disconnectible clutch connection has been provided between the automatic clutch and the driven shaft 27 which consists of a jaw clutch gear or member 107 secured to the drum 82 and adapted to be engaged with a shiftable jaw clutch gear or member 108 slidably splined to the sleeve 34' and under the control of the operator. Thus when the clutch is engaged and the operator desires to proceed immediately in low gear he simply shifts member 108 out of clutched engagement with the member 107 and when he again wants to establish the high speed relationship he may effect a rotation of the drum 82 through the action of the governor operated clutch and with the drum revolving shift the member 108 into clutch engagement with the member 107.

In connection with either the clutch member 108 of Fig. 6 or the clutch member 65 of Fig. 1, I show a shifter fork 109 having its forked end mounted in an annular recess in either of said members and its other end secured to a supporting shaft 110 slidably movable in the casing 16. The forks 109 and 47, each have a notch 111 formed therein for engagement by a lever (not shown) but which is similar to the usual gear shift lever in common usage.

With each of the foregoing constructions when the drive is through the planetary gearing the driven shaft 27 is rotated in low gear and when through the operation of either the speed responsive clutch of the first described construction or the spring type clutch of the modified form, the gear 26 is free to revolve with the gears 23 and 24 the shaft 27 is turned in high gear ratio or direct drive from the shaft 18. If when in high gear the operator desires to proceed in the low gear ratio he may do so by disconnecting the clutch elements 65, 67 or 107, 108 and then if he wishes to again put the transmission in condition for direct drive he may again engage these clutch members.

I desire it to be understood that this invention is not to be limited to any particular form or arrangement of parts except in so far as such limitations are included in the claims.

What I claim as my invention is:

1. In a planetary gear type transmission, the combination with a drive shaft, a driven shaft, a planetary gearing connection between said shafts including planet gears driven directly by the drive shaft and sun gears meshing with said planet gears, one way automatic brake mechanism for holding one of said sun gears stationary for the drive of said driven shaft through said gearing, and automatic clutch mechanism operable on a temporary reduction in speed of the drive shaft below that of the driven shaft for the release of said brake mechanism and the connection of said relatively stationary sun gear to rotate with said driven shaft.

2. In a planetary gear type transmission, the combination with a drive shaft, a driven shaft, a planetary gear unit between said shafts, means including an automatic clutch mechanism for connecting said drive and driven shafts to rotate as a unit with said gearing, a disconnectible jaw clutch connection between a part of said automatic clutch mechanism and said driven shaft, and separate clutch means for rotating said part of said automatic clutch mechanism incident to re-establishing said jaw clutch connection.

3. In a planetary gear type transmission, the combination with a drive shaft, a driven shaft, a planetary gear unit between said shafts, means including an automatic clutch mechanism for connecting said drive and driven shafts to rotate as a unit with said gearing, a disconnectible jaw clutch connection between a part of said automatic clutch mechanism and said driven shaft, and a friction clutch for connecting said part of said automatic clutch mechanism with said driven shaft operable incident to re-establishing said jaw clutch connection.

4. In a planetary gear type transmission, the combination with a drive shaft, a driven shaft, a planetary gearing connection between said shafts including gears driven directly by said drive shaft and sun gears meshing with said planet gears, one way automatic brake mechanism for holding one of said sun gears stationary for the drive through said gearing and including a shaft member secured to said sun gear, a clutch drum operatively connected with said driven shaft, a clutch element for connecting said drum with the shaft of said relatively stationary sun gear, and speed responsive means rendered operable through the rotation of said shaft for said sun gear to operate said clutch element on a temporary reduction in speed of said drive shaft below that of said driven shaft.

OSCAR H. BANKER.